(12) United States Patent
Christensen et al.

(10) Patent No.: US 9,719,604 B2
(45) Date of Patent: Aug. 1, 2017

(54) CHECK VALVE FOR A FLUID FLOW REGULATION SYSTEM

(71) Applicant: Ecolab USA Inc., St. Paul, MN (US)

(72) Inventors: William M. Christensen, Hibbing, MN (US); Eugene Tokhtuev, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 246 days.

(21) Appl. No.: 14/304,582

(22) Filed: Jun. 13, 2014

(65) Prior Publication Data

US 2015/0362086 A1 Dec. 17, 2015

(51) Int. Cl.
  *F16K 15/04* (2006.01)
  *G05D 7/06* (2006.01)
  *F16K 17/04* (2006.01)
  *F16K 27/02* (2006.01)

(52) U.S. Cl.
  CPC ........ *F16K 15/046* (2013.01); *F16K 17/0406* (2013.01); *F16K 27/0209* (2013.01); *G05D 7/0635* (2013.01); *Y10T 137/7927* (2015.04); *Y10T 137/86019* (2015.04)

(58) Field of Classification Search
  CPC .......... F16K 15/00; F16K 15/02; F16K 15/04; F16K 15/042; F16K 15/044; F16K 15/06; F16K 15/046; F16K 17/0406; G05D 7/0133; Y10T 137/7927
  USPC ......................................... 137/487, 539, 540
  See application file for complete search history.

(56) References Cited

U.S. PATENT DOCUMENTS

| | | | | |
|---|---|---|---|---|
| 720,100 A | * | 2/1903 | Bashlin | F16K 15/03 137/515.7 |
| 735,248 A | * | 8/1903 | Hahn | F16K 15/04 137/533.13 |
| 751,758 A | * | 2/1904 | Small | F16K 15/04 137/533.13 |
| 1,015,142 A | * | 1/1912 | Criswell | F16K 15/04 137/332 |
| 1,074,191 A | * | 9/1913 | Mixer | F16K 15/04 137/329 |
| 1,425,710 A | * | 8/1922 | Stafford | F16K 15/04 137/329.03 |
| 1,443,436 A | * | 1/1923 | Sandlin | F16K 15/04 137/329.03 |
| 1,555,934 A | * | 10/1925 | Barker | F16K 15/04 137/533.11 |
| 1,777,539 A | * | 10/1930 | Yerkes | F16K 15/04 137/533.13 |

(Continued)

*Primary Examiner* — Craig Schneider
*Assistant Examiner* — P. Macade Nichols
(74) *Attorney, Agent, or Firm* — Fredrikson & Byron, P.A.

(57) ABSTRACT

Embodiments include a flow regulating device. The flow regulating device may include a check valve. The check valve can have a first flange, a second flange and a ball seated against a seat defined by the first flange. The check valve is in a closed position when the ball is seated against the first flange. One or more stoppers may be positioned at a distance from the first flange. A fluid may flow through a first orifice and a second orifice defined in the first and second flanges respectively, when the first check valve is in an open position. The fluid lifts the ball from the first orifice, and pushes the ball towards the second orifice. The stoppers abut the ball when the first check valve is in a fully open position.

23 Claims, 10 Drawing Sheets

(56) References Cited

U.S. PATENT DOCUMENTS

| | | | | |
|---|---|---|---|---|
| 1,898,303 A | * | 2/1933 | Hunt | F16K 15/00 137/527.8 |
| 3,059,667 A | * | 10/1962 | Coceano | F16K 15/04 137/533.13 |
| 3,302,662 A | * | 2/1967 | Webb | F16K 15/046 137/539 |
| 3,335,750 A | * | 8/1967 | Kepner | F16K 15/044 137/515.5 |
| 3,483,888 A | * | 12/1969 | Wurzel | F16K 1/14 137/539 |
| 3,768,509 A | * | 10/1973 | Goda | F16K 15/046 137/539 |
| 3,814,547 A | * | 6/1974 | Kitrilakis | A61M 1/1037 417/383 |
| 4,209,258 A | * | 6/1980 | Oakes | B01F 15/00253 137/98 |
| 4,286,573 A | * | 9/1981 | Nickel | F24H 9/124 122/14.31 |
| 4,446,886 A | * | 5/1984 | Taylor | F16K 15/044 137/469 |
| 4,474,208 A | * | 10/1984 | Looney | F16K 17/0406 137/516.29 |
| 4,622,994 A | | 11/1986 | Rosaen | |
| 4,665,940 A | * | 5/1987 | Jacobson | B65D 83/425 137/212 |
| 4,821,954 A | * | 4/1989 | Bowder | G05D 23/10 236/48 R |
| 4,945,945 A | * | 8/1990 | Schmid | F16K 15/04 137/512 |
| 5,107,890 A | | 4/1992 | Gute | |
| 5,589,642 A | | 12/1996 | Agar et al. | |
| 5,593,292 A | * | 1/1997 | Ivey | F04B 53/1007 137/533.15 |
| 5,785,083 A | * | 7/1998 | Tang | F16K 15/04 137/533.13 |
| 5,992,230 A | * | 11/1999 | Scarpa | F04C 2/126 418/206.5 |
| 6,510,869 B1 | | 1/2003 | Ouchi et al. | |
| 6,948,521 B2 | * | 9/2005 | Fukano | F16K 15/021 137/515.5 |
| 7,093,565 B2 | * | 8/2006 | Robison | F24H 9/124 122/14.31 |
| 7,104,461 B2 | * | 9/2006 | Restivo, Sr. | E03B 7/12 236/12.1 |
| 7,191,666 B2 | | 3/2007 | Parris et al. | |
| 7,237,569 B2 | | 7/2007 | Shieh | |
| 7,513,150 B2 | | 4/2009 | Parris et al. | |
| 7,851,775 B2 | * | 12/2010 | Hoyt | G01F 3/10 250/231.15 |
| 8,096,319 B2 | | 1/2012 | Beck | |
| 8,166,828 B2 | * | 5/2012 | Skirda | G01F 3/10 73/861.08 |
| 8,381,400 B2 | | 2/2013 | Beck et al. | |
| 8,943,901 B2 | * | 2/2015 | Tokhtuev | G01F 1/06 73/861.77 |
| 2006/0251533 A1 | * | 11/2006 | Nighy | F04B 43/0736 417/479 |
| 2010/0199758 A1 | * | 8/2010 | Tokhtuev | G01F 3/10 73/261 |
| 2011/0056707 A1 | * | 3/2011 | Gamble | A62C 5/02 169/14 |
| 2012/0024080 A1 | * | 2/2012 | Carbone, II | G01F 3/10 73/861.04 |
| 2012/0031195 A1 | * | 2/2012 | Skirda | G01F 3/10 73/861.08 |
| 2012/0085434 A1 | | 4/2012 | Powanda | |
| 2013/0139913 A1 | | 6/2013 | Haeckel et al. | |
| 2014/0109644 A1 | * | 4/2014 | Carbone, II | G01F 25/0007 73/1.16 |
| 2014/0260672 A1 | * | 9/2014 | Tokhtuev | G01F 1/06 73/861.77 |
| 2015/0362086 A1 | * | 12/2015 | Christensen | F16K 15/046 137/539 |
| 2016/0018247 A1 | * | 1/2016 | Pilipchenko | G01F 3/10 73/261 |

* cited by examiner

CHECK VALVE FOR A FLUID FLOW REGULATION SYSTEM

FIELD

This disclosure generally relates to systems and methods for measuring fluid flow. More particularly, this disclosure relates to check valves for regulating fluid flow direction.

BACKGROUND

Fluid measurement systems may be used to measure a flow rate or volume of a fluid or gas. For example, dispensing systems may use feedback from a positive displacement fluid meter to control the volume of fluid dispensed. Such control systems are often used in lieu of time-on controls to more accurately dispense precise amounts of fluid or gas and are commonly used in a variety of settings including, but not limited to, the industrial, healthcare, pharmaceutical and food and beverage industries. For example, a flow meter may be used in the manufacturing process of a drug which requires accurate measurement of two materials to be mixed into a single batch. The flow meter may be installed in the supply lines of the respective materials and feedback from the meters may be used to dispense the appropriate amount of each material into a blend tank to be mixed. Flow meters may measure accurately measures a volume of fluid or gas to comply with regulatory requirements in many industries.

Oval gear meters are an example of a positive displacement flow meter. Such positive displacement flow meters generally involve mechanical displacement of components (e.g., gears) of the flow meter to measure flow. An oval gear meter provides a pair of intermeshing oval gears positioned within a chamber. A fluid may be introduced into the chamber through an inlet, and the pair of gears may rotate synchronously with each other. The intermeshing of the gears prevents the fluid from passing between the gears. Rather, the fluid passes around the gears within pockets defined between the oval gears and the chamber. The volume of each pocket of fluid is precisely measured. Thus, the volume of fluid exiting the chamber during each rotation is known. Thus, measuring the number of rotations of the gears can be used to determine the volume of fluid, and the speed of rotation of the gears can be used to determine the flow rate.

Typical oval gear meters may accurately measure fluid flow in applications having a high fluid flow rate or a relatively uniform fluid flow (e.g., flow through peristaltic pumps or in pressure-maintained fluid lines). In applications having low flow rates or where the flow is non-uniform, however, typical oval gear meters may have a lower accuracy of measurement. For example, non-uniform flow generated by a diaphragm pump may cause pressure shocks which generate oscillations in the fluid lines after each pump cycle. The oscillations may produce vibrations, or "jitter," of the oval gears, or a backflow of fluid through the oval gear meter. Such jitters or backflow may induce false signals and/or an inaccurate rotational count of the oval gear meter. False signals may also be induced by backflow of fluid into an oval gear meter. Additionally, oval gear meters in low flow applications may also have increased error due to leakage of fluid around the oval gears.

Check valves are well-known in the art for regulating flow. However, adding one or more check valves may increase the cost and complexity of the flow measuring system.

SUMMARY OF THE INVENTION

Embodiments of the invention include a flow-regulating device for regulating flow in a fluid line. The flow-regulating device may include a flow meter such as an oval gear flow meter for measuring flow rate in a fluid line of fluid system. The flow-regulating device may include an inlet recess and an outlet recess that define a passage for flow of a fluid. The flow regulating device may allow a forward direction of flow occurs from the inlet recess to the outlet recess.

In certain embodiments, the flow-regulating device may include at least one check valve. In some embodiments, the check valve may not need a separate shell or a body and positioned into a flow passage directly. In certain embodiments, the first flange, the second flange and the ball may be positioned directly inside a fluid line (e.g., pipe or tubes). Alternatively, portions of the check valve may be inserted in the recesses (e.g., inlet and outlet recesses) defining a passage for flow. The check valve may include a first flange having a first orifice, a second flange positioned opposite the first flange, having a second orifice, and a ball seated against the first orifice when the check valve is in a closed position. The first flange may have a crushable rib or a groove for a seal (e.g., O-rings) on its outer surface which eliminates leakage around the first flange and to direct flow substantially toward the first orifice. In some embodiments, the check valve may include one or more of stoppers. In such embodiments, flow from the first orifice to the second orifice is configured to lift the ball from the first orifice, and push the ball towards the second orifice. When the ball moves away from the first orifice, the check valve is in an open position. When flow in a forward direction stops, the ball may move back to the first orifice. In some embodiments, back pressure may act on the ball to move the ball back to the first orifice, thereby preventing flow from a backward direction (e.g., from second orifice toward first orifice). In some embodiments, the check valve may be oriented in a vertical direction, such that a forward direction of flow from the first orifice toward the second orifice is along an upward direction. The stoppers are configured to abut the ball when the check valve is in a fully open position. In such embodiments, the check valve may include a first set of ribs extending from the first flange and a second set of ribs extending from the second flange. The first set of ribs can engage with the second flange and the second set of ribs can engage with the first flange. The stoppers may then be integrally formed on the first set of ribs, and extending radially inward.

In some embodiments, the ball may be seated against a seat defined by the first flange. A pair of seating members can be defined on the second set of ribs. The seating members may exert a first force on the ball. The first force can be adapted to seat the ball against the first orifice when the check valve is in the closed position. When fluid enters the first orifice and pushes against the ball, a second force is exerted on the seating members by the ball. The second force of the ball overcomes the first force from the seating members, and thereby deflecting the seating members.

Certain embodiments of the check valve may include an insert sealingly engaging with the first orifice of the first flange. The insert may have an orifice for flow of fluid. The orifice may have a tapered internal surface forming an angle of approximately 30 degrees and approximately 60 degrees with the axis of the check valve.

The details of one or more embodiments of the invention are set forth in the accompanying drawings and the description below. Other features, objects, and advantages will be apparent from the description and drawings, and from the claims.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1A:
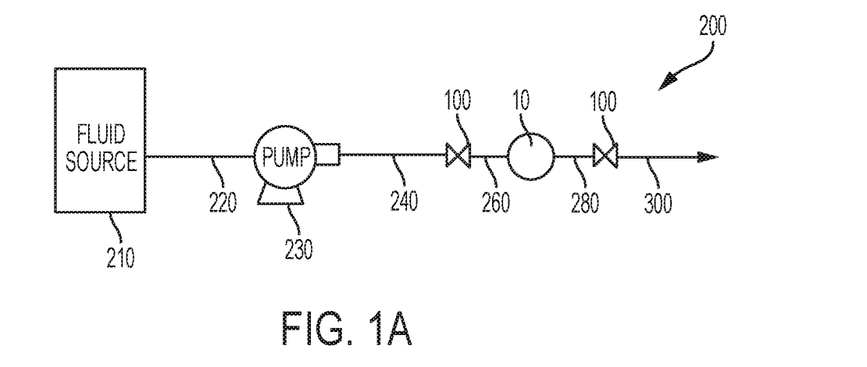
FIG. 1A is a schematic of a fluid system with a flow regulating device according to an embodiment of the invention.
Figure 1B:
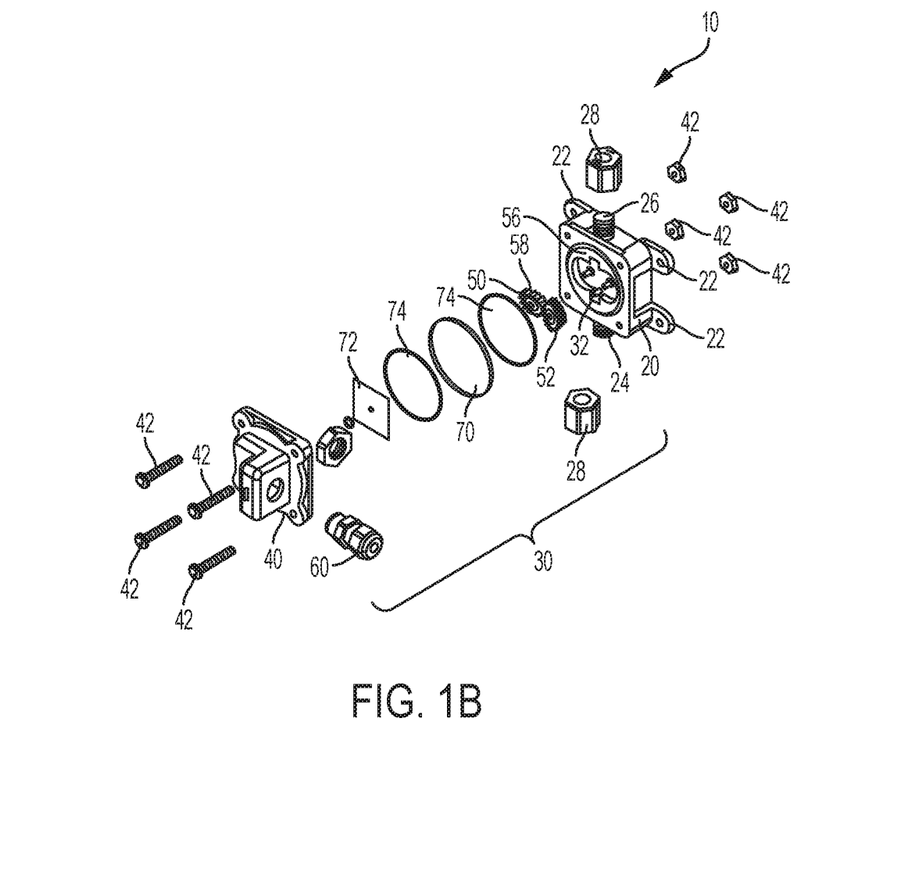
FIG. 1B is an exploded perspective view of a flow-regulating device according to an embodiment of the invention.

FIG. 1A is a schematic of a fluid system 200 with a flow-regulating device 10 according to an embodiment of the invention and FIG. 1B is an exploded perspective view of a flow-regulating device 10 according to an embodiment of the invention. The fluid system 200 in the illustrated embodiment may be configured for delivering a fluid. The fluid system 200 may include any number of fluid lines 220, 240, 260, 280, 300 (e.g., pipes, tubes and the like, configured for passage of fluids). The flow-regulating device 10 may be in fluid communication with any fluid line 220, 240, 260, 280, and 300. The fluid lines 220, 240, 260, 280, and 300 may be connected to each other, and with any other components of the fluid system 10 with one or more fluid adapters (e.g., coupling fasteners, adhesives, or any other connectors known in the art). In the illustrated embodiment shown in FIG. 1A, the flow-regulating device 10 is in fluid communication with fluid lines 260, 280. With continued reference to FIG. 1A, the fluid system 200 may include a pump 230 configured for supplying pressurized fluid from a fluid source 210 (e.g., reservoir) through the fluid system 200. In an exemplary embodiment, the flow-regulating device 10 can be in fluid communication with a fluid line 260 that may supply pressurized fluid from the fluid source 210 to a target area. In another exemplary embodiment, the flow-regulating device 10 may be in fluid communication with a dispensing system to dispense a fluid. Such systems may be used in healthcare, pharmaceutical (e.g., drug delivery), food and beverage facilities (e.g., cleaning, sanitizing, supplying water, beverages etc.) and in industrial and manufacturing processes. The flow-regulating device 10 may facilitate delivering, dispensing and/or measuring precise quantities of fluid.

As seen in FIG. 1B, the flow-regulating device 10 may include a housing 20. The housing 20 may include one or more flanges 22 that may allow the flow-regulating device 10 to be mounted to a support surface (e.g., a wall). An inlet recess 24 and an outlet recess 26 may be defined in the housing 20. The inlet and outlet recesses 24, 26 define a passage for the flow of a fluid. A pump (not shown) may supply pressurized fluid, which may flow in a forward direction from the inlet recess 24, via internal passageways in the housing 20, to the outlet recess 26. Connectors 28 (e.g., threaded nuts as illustrated in FIG. 1B) are provided for connecting the inlet recess 24 and outlet recess 26 to various flow components. In some embodiments, the flow-regulating device 10 may include a flow meter, for measuring the volume or flow rate of fluid passing through the fluid line. The flow-regulating device 10 may "regulate" flow in the fluid line. The flow-regulating device 10 may perform operations such as selectively opening and closing a portion of the fluid line, allowing unidirectional flow of fluid when provided with one or more check valves, and/or measure flow rate of fluid, when provided with a flow meter.

With continued reference to FIG. 1B, some embodiments of the flow-regulating device 10 include an oval gear flow meter. An exemplary oval gear meter is described in U.S. Pat. No. 8,166,828, assigned to Ecolab USA Inc., the disclosure of which is hereby incorporated by reference in its entirety. The oval gear meter 30 may be configured for measuring fluid flow through the fluid system. The oval gear meter 30 may be positioned on the housing 20 and disposed about a fluid chamber 32. The oval gear meter 30 and the housing 20 may be enclosed by a front cover 40, connected to the housing 20 by a number of fasteners 42. The oval gear meter 30 may include a pair of intermeshing oval gears 50, 52, rotating about their respective axes as the fluid enters the fluid chamber 32. The gears 50, 52 may be disposed such that they define a gap "a" between walls of the fluid chamber 32 and the gears 50, 52 to facilitate unobstructed gear rotation. The fluid passes around the rotating gears 50, 52 within pockets 54 defined between the oval gears 50, 52 and the chamber wall 56. The number of rotations of the gears 50, 52 may then be measured and correlated with the volume of fluid passing through the fluid chamber 32, and the speed of rotations of the gears 50, 52 can be correlated with the flow rate of fluid in the fluid line.

As best seen in FIG. 1B, a number of gear teeth 58 may be disposed on the periphery of the oval gears 50, 52. In certain embodiments, two, three or four teeth of each oval gear along the major axis of the oval gear can have a same radial distance from the center of the respective oval gears 50, 52. Such embodiments may facilitate optimal rotation and/or meshing of the gears 50, 52, and ensure that the gears conform to standard sizes and geometries of oval gear design.

In some embodiments, the oval gear meter 30 may include a sensor (not shown) to measure the number and/or speed of rotation of the oval gears 50, 52. The sensor can be an optical sensor or encoder that may detect an optical characteristic (e.g., reflectance) from a preselected area of the oval gears 50, 52. As the oval gear meter 30 rotates, the sensor may detect the optical characteristic from various areas of the oval gears 50, 52, which may then be used to determine rotational speed and/or number of rotations of the oval gears 50, 52. A controller (not shown) may be electrically coupled to the sensor (e.g., via electrical connection points 60 best seen in FIG. 1B) to generate a rotational count based on the reflectance sensed by the sensor. In the illustrated embodiment shown in FIG. 1B, the sensor may be positioned in the front cover 40. A separation member 70 (e.g., a filter or a window) transparent to radiation of certain wavelengths (e.g., a portion visible spectrum, infrared radiation etc.) may be positioned to provide the sensor with an unimpeded view of the rotating gears. The separation member 70 may be made of glass, borosilicate, sapphire, acrylic glass plastics such as polycarbonate, polyethylene, polyester etc. or other suitable materials (e.g., inert materials). An aperture 72 may optionally be used to facilitate the sensor to detect preferred areas of the gears 50, 52. A number of rings 74 may seal the fluid chamber 32 in a fluid tight manner to prevent leakage of fluid from the flow-regulating device 10.

Measurement errors due to flow oscillations and/or jitters of the oval gears can be further eliminated with additional detectors. These detectors may detect the changes in reflective surfaces of the gear to generate a rotational count. The detectors can be set to generate signals representative of the rotational counts. The detectors can be positioned to detect an area of the gears unaffected by jitters (e.g., center of a highly reflecting region). Thus, oscillations and/or jitter in each signal at the moment when the sensor senses a transition from a highly reflective area to less reflective area may not affect rotational count because the sensor counts may be synchronized with additional detectors when transition occurs.

As discussed previously, typical oval gear meters may not provide accurate measurements when the flow rate is low, or if the flow in the fluid line is non-uniform. For example, non-uniform flow generated by a diaphragm pump may cause fluid oscillations in the fluid lines during pump operation. The fluid oscillations may produce vibrations, or "jitter," of the oval gears or a backflow of fluid through the meter. The jitters or backflow may induce the controller to generate an inaccurate rotational count. Additionally, oval gear meters in low flow applications may also have increased error due to leakage of fluid around the oval gears. In certain embodiments, one or more check valves 100 may be provided to improve the accuracy of the flow meter.

Figure 2:
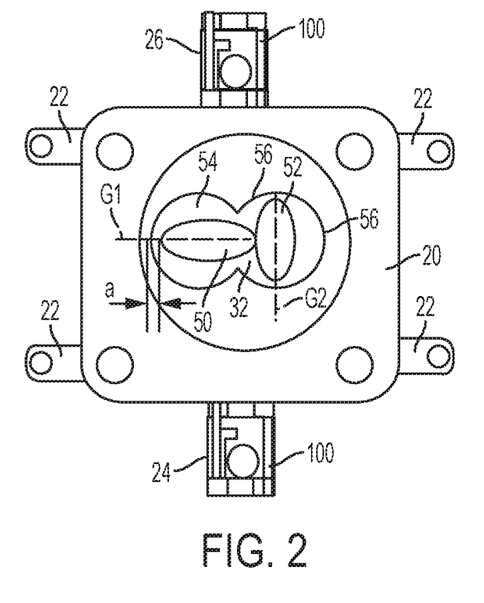
FIG. 2 is a front cross-sectional view of a flow-regulating device according to an embodiment of the invention.

FIG. 2 is a front cross-sectional view of the flow-regulating device 10. As seen in FIGS. 1A and 2, the flow-regulating device 10 may include one or more check valves. A first check valve 100 can be positioned in the inlet recess 24. The flow-regulating device 10 may include a second check valve 100 positioned in the outlet recess 26. Fluid may flow from a fluid line via the recesses, and when the check valves are in an open position, through passageways defined by the check valve. Each of the inlet and outlet recesses 24, 26 may be configured for receiving a tube or a pipe (not shown) of the fluid line. For instance, the outer surfaces of the inlet and outlet recesses 24, 26 may include a threaded portion (best seen in FIG. 1), configured for engaging with standard-sized threaded adapters or fasteners and connect to a tube or pipe that supplies the fluid from the fluid source. Referring back to FIG. 2, the check valves 100 may be inserted directly into the inlet and outlet recesses 24, 26 (e.g., via a frictional fit). Alternatively, the check valves 100 may be integrally and/or unitarily formed (e.g., molded) with the housing 20 of the flow-regulating device 10. While such embodiments minimize assembling multiple components, other embodiments are also contemplated. For instance, the check valves 100 may be separate and distinct from the flow-regulating device 10, and operatively coupled to the flow-regulating device 10 by fasteners (e.g., threaded connectors covered by Teflon tape, bolt-and-nut, adhesive etc.). In an exemplary embodiment, the check valve 100 may have one or more protrusions (not shown) on its outer surface which may deflect inwards when the check valve 100 is pushed into the recess. The protrusions may then release and/or abut against the inner walls of the inlet and outlet recesses 24, 26 thereby firmly seating the check valve 100 within the inlet and outlet recesses 24, 26. Once placed in the inlet and outlet recesses 24, 26, the check valves 100 may prevent back flow and/or jitters as will be described below, thereby eliminating any false detection of rotational count. While the illustrated embodiment uses check valves to improve the accuracy of oval gear flow meters, the check valves can be used in any fluid system to provide unidirectional flow in a fluid line of the fluid system. For instance, if the fluid system is used for delivering a fluid to a target, the check valve may regulate the flow such that fluid flows from a source to the target, and back flow from the target to the source is prevented. In certain embodiments, check valve 100 may be included in both the inlet recess 24 and the outlet recess 26. In certain embodiments, check valve 100 is included in only one of the inlet recess 24 and the outlet recess 26.

Figure 3:
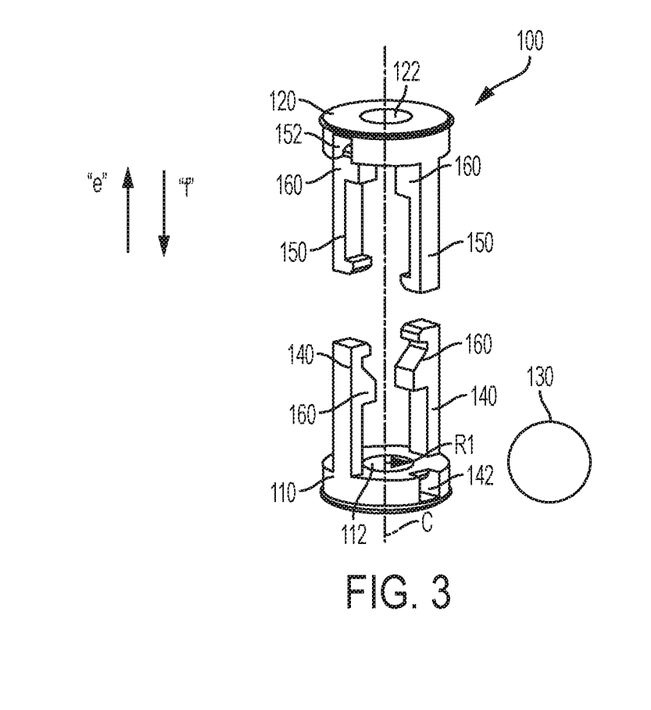
FIG. 3 is an exploded perspective view of a check valve according to an embodiment of the invention.
Figure 4:
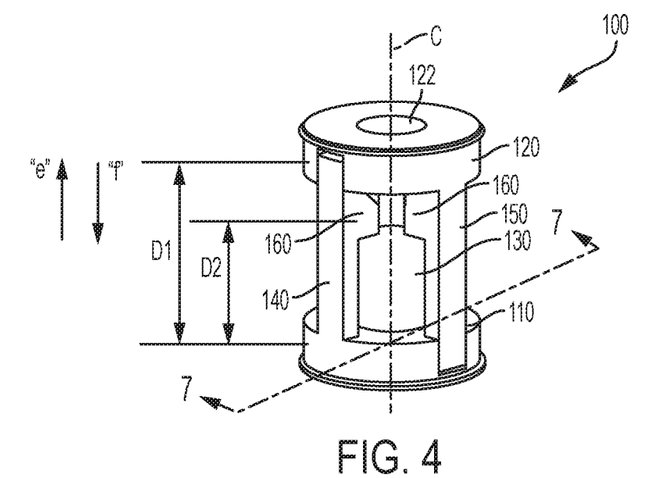
FIG. 4 is a perspective view of the check valve of FIG. 3.

FIGS. 3 and 4 illustrate a check valve 100 according to an embodiment of the invention. The check valve 100 can be made of a moldable polymer. Such embodiments may render the check valve 100 biocompatible and suitable for fluid dispensing in healthcare and pharmaceutical industry. Alternatively, the check valve 100 can be made of a material with suitable chemical properties (e.g., inert to specific chemicals), and or/suitable mechanical properties (e.g., resistant to deformation). In certain embodiments, the check valve 100 does not include any metal components (e.g., springs), and is suitable for use in a variety of fluid systems (e.g., dispensing corrosive chemicals).

The check valve 100 may include a first flange 110 having a first orifice 112 and a second flange 120 positioned opposite the first flange 110 along an axis of the check valve "C". The fluid may flow along the axis of the check valve "C". The second flange 120 may be positioned at a first distance "D1" from the first flange 110. The second flange 120 has a second orifice 122. In the embodiment illustrated in FIGS. 3 and 4, fluid flow is said to be in a forward direction when fluid passes from the first orifice 112 and moves towards the second orifice 122 and in a reverse direction when the fluid flows from the second orifice 122 towards the first orifice 112. The first and second flanges 110, 120 can be of any shape, and are illustrated as disc shaped, configured to be positioned in internal cylindrical inlet and outlet recesses 24, 26. In certain embodiments, the check valve 100 may be integrally formed with a flow-regulating device 10 and thus, the first and second flanges 110, 120 can be complementarily shaped to be received by internal passageways of the flow-regulating device 10 and/or fluid lines of the fluid system. For instance, the inlet and outlet recesses 24, 26 may have a rectangular cross-section. In such embodiments, the first and second flanges 110, 120 may have a rectangular cross-sectional area in the flow-direction to be received by the inlet and outlet recesses 24, 26 respectively.

As seen in FIG. 4, the check valve 100 may include a ball 130. While typically spherical in shape, the ball 130 may be of any shape (e.g., oval, disc-shaped etc.). The ball may typically be of sapphire, but balls made of ruby, zirconia and/or alumina ceramic, or materials inert to specific chemicals are also contemplated. The ball can have a diameter larger than the diameters of the first and second orifices 112, 122. The ball 130 may rest against the first orifice 112 when the check valve 100 is in a closed position. In other words, the first orifice 112 acts as a seat to receive the ball 130. In the closed position, no flow occurs through the check valve 100. Once the incoming fluid pressure at the first orifice 112 achieves a certain level, the fluid may lift the ball 130 from the seat formed by the first orifice 112 and move it towards the second orifice 122. When the ball 130 is lifted away from the first orifice 112, the check valve 100 is in an "open position" and allows passage of flow from the first orifice 112, around the ball 130 and out of the second orifice 122. When the flow stops in the fluid system, or if the direction of flow is reversed, the ball 130 may move back to the first orifice 112.

The stream of fluid entering via the orifice may impinge on the ball 130 with a pressure, thereby pushing the ball 130 to a distance away from the first orifice 112. The minimum pressure required to move the ball 130 from the closed position may be referred to as "cracking pressure". Certain embodiments of the check valve 100 may have extremely low cracking pressure of about 0.03 pounds per square inch (20 millimeters of water) corresponding to low flow rates of about 0.1 milliliters per second. Such embodiments may allow the check valve 100 to open within a few milliseconds of flow being supplied (e.g., by a pump) to the orifice, and close within a few milliseconds of flow being stopped (e.g., by shutting off the pump) or reversed, providing nearly instant flow regulation and/or improved flow rate measurement.

As seen in FIGS. 3 and 4, the axis of the check valve "C" can be parallel to a generally vertical direction. In this configuration, when the cracking pressure balances the weight of the ball 130, the check valve 100 opens, and the ball 130 begins to lift in a generally upward direction "e". Once the flow stops, the ball 130 returns to its initial position against the first orifice 112, because of the weight of the ball 130 acting in a generally downward direction "f". During the operation of the check valve 100, if back flow or oscillations in pressure occurs in the fluid line, any fluid flowing from the second orifice 122 of the check valve 100 may act on the ball 130 in a downwardly direction "f", and may push the ball 130 against the first orifice 112, thereby shutting off the check valve 100 (e.g., preventing fluid flow through the check valve 100). The illustrated embodiment shows a vertical orientation of the check valve 100. In alternate embodiments, the check valve may operate in any orientation. For instance, the check valve may open when flow occurs from the first orifice to the second orifice, with a force directed to push the ball away from the first orifice. The check valve may close when backward flow occurs, i.e., when flow is oriented from the second orifice to the first orifice, with a force directed to seat the ball in the first orifice.

As seen in FIGS. 3 and 4, a first set of ribs 140 may extend from the first flange 110 and a second set of ribs 150 may extend from the second flange 120. While two ribs are shown extending from each of the first and second flanges 110, 120, any number of ribs may be provided. The first set of ribs 140 may engage with an opening 152 on the second flange 120 and the second set of ribs 150 may engage with an opening 142 on the first flange 110. The first and second sets of ribs 140, 150 engage with the openings 152, 142 on the second and first flange 110 respectively via a snap fit or a frictional fit.

As shown in FIGS. 3 and 4, the check valve 100 may include at one or more stoppers 160. The stoppers 160 may extend from the first flange 110. The stoppers 160 may extend radially inward toward the axis of the check valve "C". The stoppers 160 may abut the ball 130 when the check valve 100 is in a fully open position. Each stopper may be integrally formed with the first set of ribs 140. The stoppers 160 may extend from the second set of ribs 150. The stoppers 160 can be molded together with the first flange 110. The stoppers 160 limit the maximum distance to which the ball 130 can be pushed away from the seat of the first orifice 112 by the incoming fluid. The stoppers 160 may be at the second distance "D2" from the first flange 110 along the axis of the check valve "C". The stoppers 160 abut the ball 130 at this distance "D2", and limit further movement of the ball 130 towards the second orifice 122. Thus, when the ball abuts against the stopper 160, the check valve is "fully open." In the fully open position, fluid may flow from orifice 112, around ball 130, and through orifice 122. As seen in FIG. 4, the second distance "D2" is less than the first distance "D1". While the stoppers 160 may be disposed at any distance from the first flange 110 (e.g., equal to the first distance "D1"), stoppers placed closer towards the first flange 110 may allow for nearly instantaneous opening and closing of the valve, than stoppers placed closer towards the second flange 120. In certain embodiments, the second distance "D2" approximately equals one-half of a radius "$r_1$" of the first orifice 112. In other embodiments, the second distance "D2" is less than approximately one-half of the radius "$r_1$" of the first orifice 112. For instance, the second distance "D2" can equal one-third or one-fourth of the radius "$r_1$" of the first orifice 112. However, the stoppers 160 can be placed at any distance, without loss of functionality of the check valve 100. Such embodiments may be suitable for pumps which generate low fluid pressures from about 0.5 psi to about 150 psi.

Figure 5A:
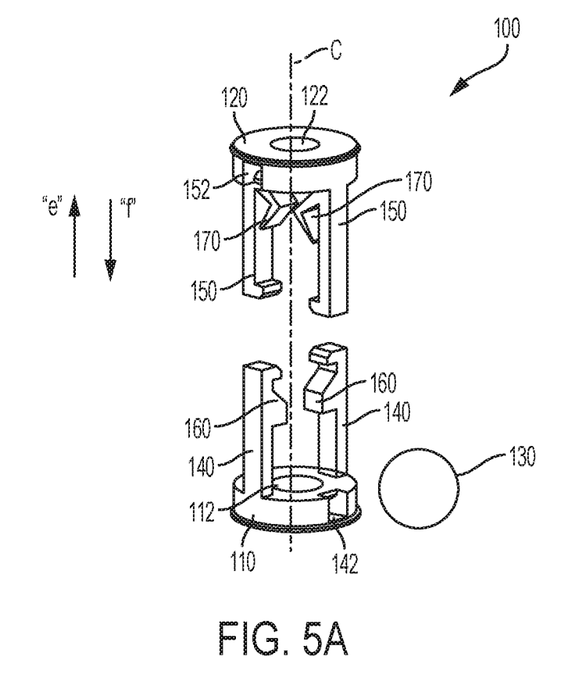
FIG. 5A is an exploded perspective view of a check valve according to a second embodiment.
Figure 6:
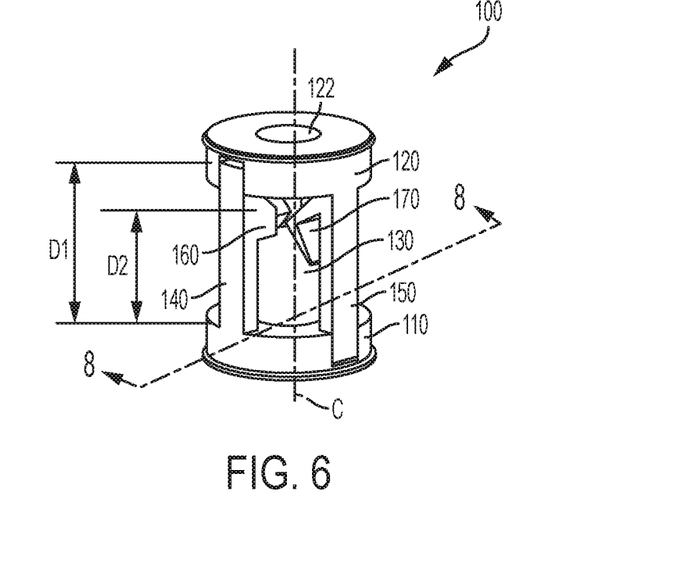
FIG. 6 is a perspective view of the check valve of FIG. 5.

FIG. 5A is an exploded perspective view and FIG. 6 is a perspective view of a check valve 100 according to a second embodiment. The check valve 100 according to such embodiments may include a first flange 110, a second flange 120 disposed along the axis of the check valve "C", and a ball 130, as described above. Unlike the embodiments illustrated in FIGS. 3-4, however, the second embodiment of the check valve 100 includes one or more seating members 170 as will be described below. As shown in FIG. 5, a pair of seating members 170 can extend from the second set of ribs 150. Alternatively, the seating members 170 can extend from the first set of ribs 140. The seating members 170 can be made of a deflectable material. For instance, the seating members 170 may be fabricated from polyetheretherketone (PEEK), polypropylene, polyvinylidene fluoride (PVDF) and molded simultaneously with molding of the first and second flanges 110, 120 and first and second set of ribs 140, 150. The seating members 170 may extend radially inward towards the axis of the check valve "C", and abut against the ball 130 when the ball 130 is seated against the first flange 110. The seating members 170 may exert a first force on the ball 130 to seat the ball 130 against the first orifice 112 when the check valve 100 is in the closed position. For instance, the seating members 170 may abut and push against the ball 130.

In the embodiment illustrated in FIG. 5, the first force acts in a downwardly direction "f". As the fluid enters the first orifice 112, the ball 130 is pushed away from the first orifice 112 if the pressure of the fluid impacting on the ball 130 is greater than or equal to the cracking pressure. This cracking pressure is transmitted by the ball 130 as a second force. The ball 130 exerts the second force on the seating members 170 that overcomes the first force from the seating members 170. When the ball 130 exerts the second force and/or pushes against the seating members 170, the seating members 170 can deflect (e.g., collapse elastically, deflect radially outwardly, deflect upwards, or get crushed). When the ball 130 moves away from the first orifice 112, the check valve 100 opens, thereby allowing the fluid to pass through the check valve 100 via first orifice 112, around ball 130, and through second orifice 122. In such embodiments, the presence of stoppers 160 restrict the movement of the ball 130 and prevent the ball 130 from exerting further force on the seating members 170 and inadvertently damaging (e.g., crushing) the seating members 170. Once the fluid stops flowing or reverses direction (i.e., from the second orifice 122 to the first orifice 112), the ball 130 may no longer exert the second force on the seating members 170. The seating members 170 may then deflect (e.g., expand elastically, deflect radially inwardly, deflect downwards, or release from its crushed state) and exert the first force on the ball 130 to seat it against the first flange 110. Embodiments with seating members 170 may facilitate improved contact between the ball 130 and the seat of the first flange 110. Additionally, in such embodiments the cracking pressure can be altered by adjusting the size, shape or mechanical properties of the seating members 170.

Figure 5B:
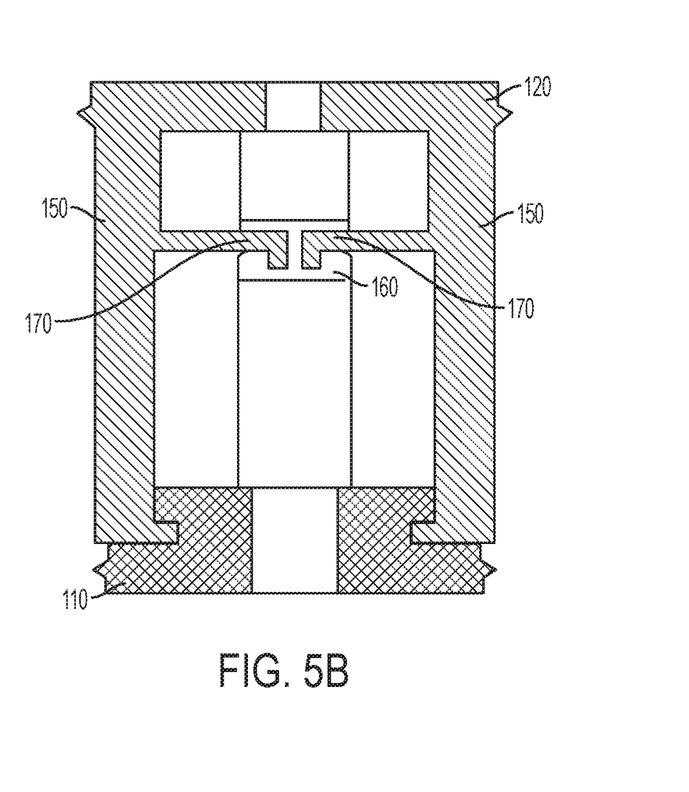
FIG. 5B is a sectional side view of the check valve shown in FIG. 5A without the ball.
Figure 5C:
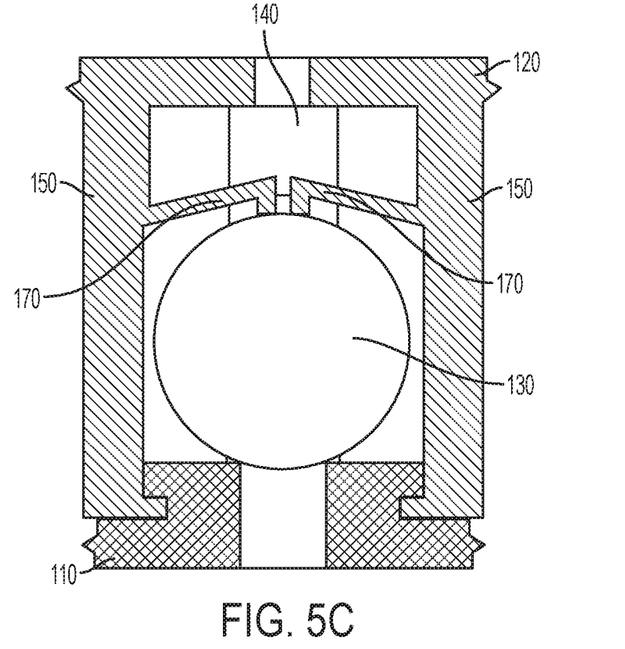
FIG. 5C is a sectional side view of the check valve shown in FIG. 5A in a closed position with ball seated in the first orifice.
Figure 5D:
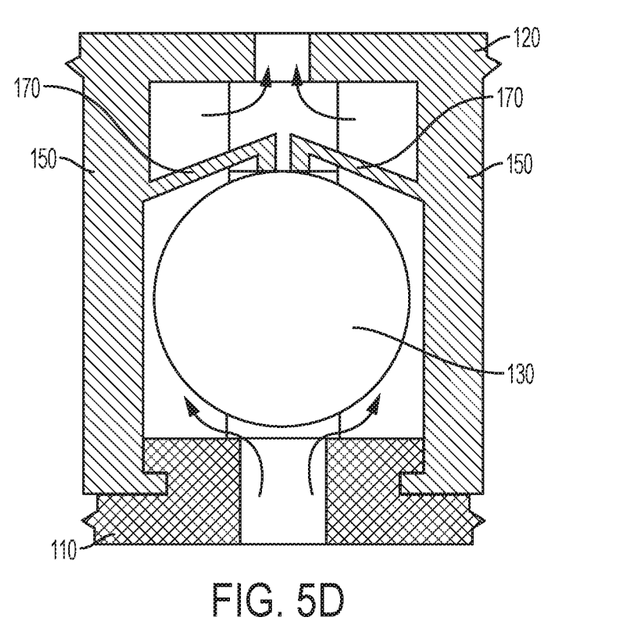
FIG. 5D is a sectional side view of the check valve shown in FIG. 5A in an open position.
Figure 5E:
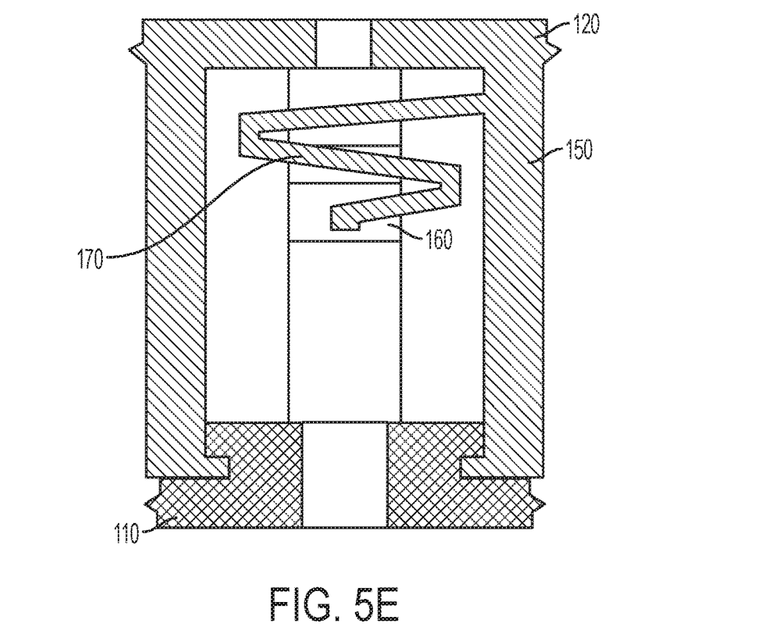
FIG. 5E is a sectional side view of a check valve according to a third embodiment.
Figure 5F:
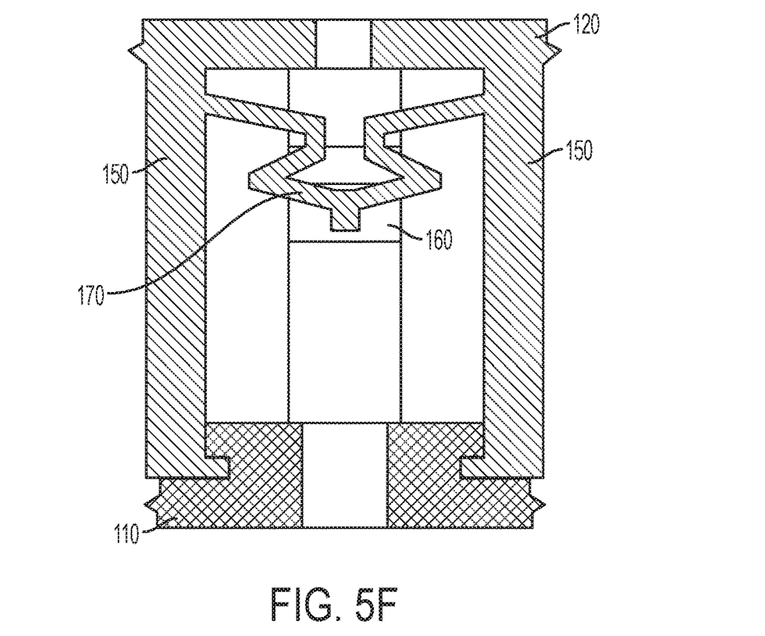
FIG. 5F is a sectional side view of a check valve according to a fourth embodiment.
Figure 5G:
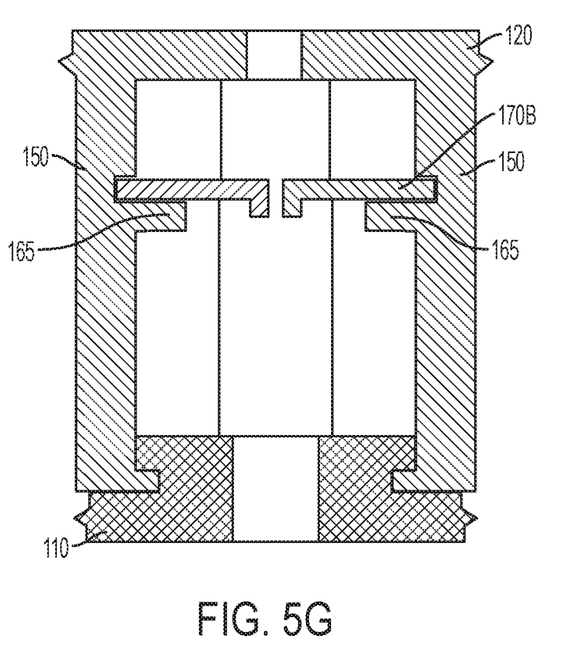
FIG. 5G is a sectional side view of a check valve according to a fifth embodiment, illustrated without the ball.
Figure 5H:
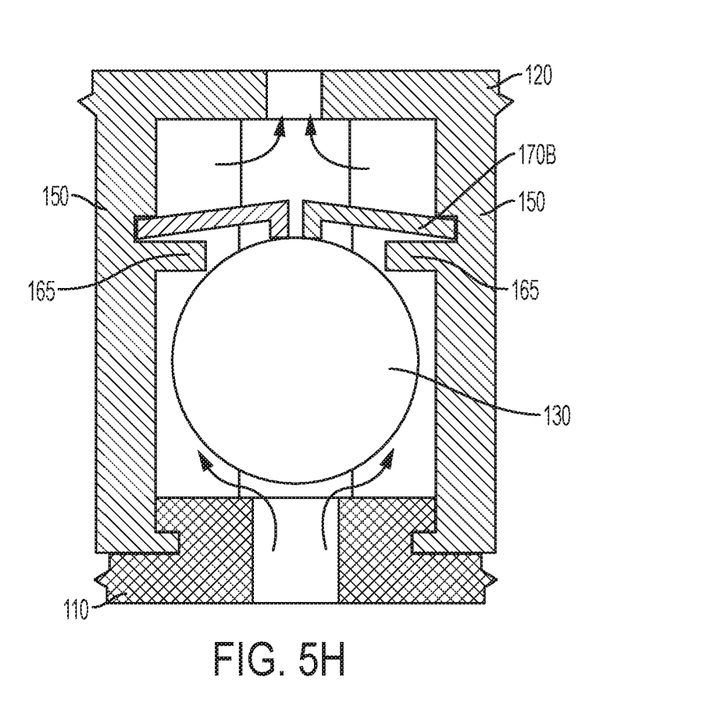
FIG. 5H is a sectional side view of the check valve of FIG. 5G in an open position.
Figure 5I:
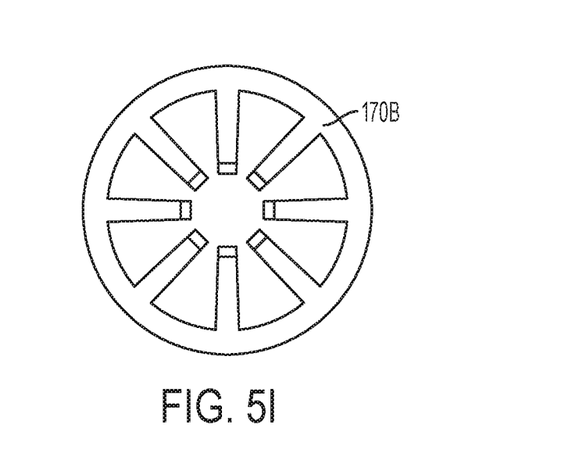
FIG. 5I a top view of a seating member according to some embodiments of the invention.

FIGS. 5B-5H illustrate cross-sectional views and FIG. 5I illustrates a top view of alternate embodiments of the seating members 170. FIG. 5B shows a check valve without the ball. The seating members 170 are molded together with the second set of ribs 150. The seating members 170 may deflect under applied force as described previously. FIG. 5C shows a check valve in the closed position. The seating members 170 are in contact with ball 130, and press against the ball 130 to keep the ball 130 seated in the first orifice 112 when the check valve is in the closed position. In this position, the seating members 170 may be in a deflected state (e.g., stretched, or flexed from the embodiment shown in FIG. 5B). FIG. 5D shows the check valve in the open position. Fluid pressure may lift the ball 130 deflecting the seating members 170 further from the position illustrated in FIG. 5C. The ball 130 may be positioned such that there is a gap between the ribs 150 and the ball 130 to facilitate unobstructed movement of the ball 130. Of course, as may be discerned from the cross-sectional views of FIGS. 5C, 5D, and 5H, fluid can flow through the check valve in the direction of illustrated arrows shown in FIGS. 5D and 5H. As the ribs 140 are present only over a portion of the circumference of the check valve (best seen in FIGS. 4 and 5A), the fluid may flow via areas in the check valve where ribs 140 are not present, and the fluid flowing in such areas may be bound by a wall of a fluid line or internal recesses (e.g., recesses 24, 26 of FIG. 2) within which the check valve is positioned (best seen in FIG. 2). As the ball 130 reaches stoppers 160 on the first set of ribs 140 the seating members 170 may not move any further. FIG. 5E and FIG. 5F show another embodiment of seating members 170. The embodiments illustrated in FIGS. 5D-5F can be molded with a two-part mold having one retractable pin. Such molding processes allow for lower production costs.

FIGS. 5G-5I illustrate the seating members 170B according to another embodiment. FIG. 5G for shows the check valve without the ball 130. FIG. 5I shows a top view of the seating member 170B according to an embodiment. During assembly or manufacture of the check valve, the seating member 170B is inserted into slits 172 defined in the second set of ribs 150. The ball 130 is placed inside the check valve and the first and second flanges 110 and 120 are connected to each other (e.g., by a snap fit or push fit). The seating member 170B stays secured in the slits 172, creating initial pressure on the ball 130. Under fluid pressure the ball 130 moves away from the first orifice 112, thereby overcoming the force from the seating member 170B. The ball 130 stops when it reaches the stoppers 165. The check valve in open position is shown in FIG. 5H. The seating member 170B can be molded from same material (e.g., plastic) as the other parts of a check valve thereby providing chemical compatibility. In alternative embodiments the seating member can be made of stainless steel. In other embodiments, the seating member can comprise a conical stainless steel spring secured in slits 172 on ribs 150 or at a surface near the flange 120.

Figure 7:
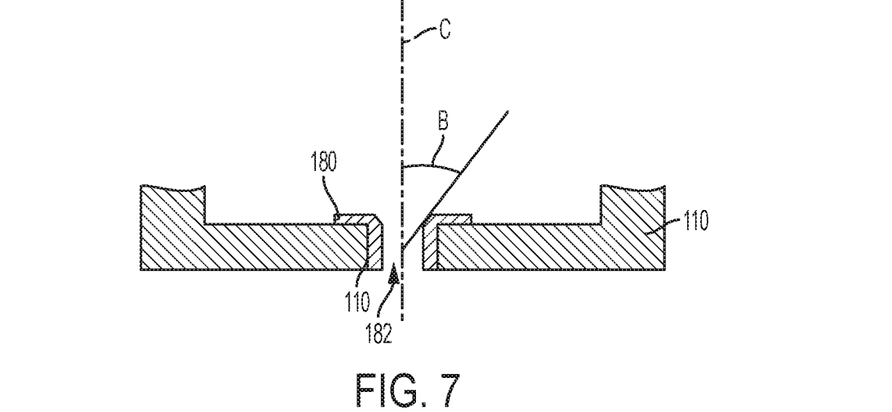
FIG. 7 is a front cross-sectional view of a portion of the check valve taken along the line A-A of FIG. 4 or FIG. 6.

FIG. 7 is a front cross-sectional view of a portion of the check valve 100, proximate flange 110, taken along line 7-7 (best seen FIG. 4). As seen in FIG. 7, the check valve 100 may include an insert 180 sealingly engaging with the first orifice 112 of the first flange 110. The insert 180 can be made of fluorocarbon and can be pressed into the first orifice 112 of the first flange 110. Alternatively, the first flange 110 may engage with the insert 180 according to any known means (e.g., mating threads covered by Teflon tape, adhesive etc.). The insert 180 can minimize losses in fluid pressure due to sharp edges and/or sudden changes in cross-sectional area as fluid enters the check valve 100. To this end, the insert 180 may have an orifice 182 with a tapered surface for providing a gradually changing cross-sectional area in the direction of flow. The tapered surface may form an angle "B" between about 30 degrees and about 60 degrees. In an exemplary embodiment, the tapered surface of the orifice may form a 45 degree angle with the flow direction. The ball (not shown in FIG. 7) may be seated tangential to the tapered surface in such embodiments.

Embodiments with an insert may allow the first flange 110 to be manufactured with any preferred dimensions. For instance, the first orifice 112 of the first flange 110 may be of a larger diameter than in the case of embodiments without the insert 180. The insert 180 may be manufactured to tight tolerances and sealingly engaged with the first orifice 112. In addition to the embodiments described above, the first flange 110 may include a cylindrical groove with an O-ring providing a tight seal between the orifice and the insert 180. Such embodiments may allow the check valve 100 to be disassembled and re-assembled easily so that when re-assembled, the check valve 100 includes a tightly sealed insert 180 on which the ball 130 may be placed.

Figure 8:
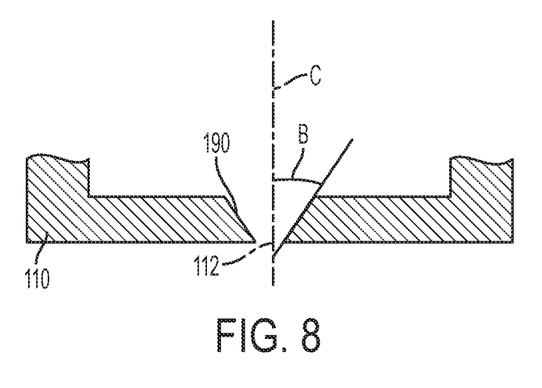
FIG. 8 is a front cross-sectional view of a portion of check valve taken along the line A-A of FIG. 4 or FIG. 6.

In alternate embodiments best seen in FIG. 8, illustrating a cross-sectional view taken along the plane 8-8 seen in FIG. 6, instead of an insert, the first orifice 112 may be defined by a tapered internal surface 190. For instance, the first flange 110 may be formed with a tapered internal surface 190 by molding. The tapered surface 190 may form an angle "B" between about 30 degrees and about 60 degrees with the flow direction. The ball (not shown in FIG. 8) may be seated tangential to the tapered surface in such embodiments. Alternatively, or in addition, the first orifice 112 may be defined by one or more chamfered edges to avoid sharp edges abutting the flow and introducing pressure losses. The edges forming the orifice may be chamfered (not shown) by an angle between about 30 degrees and about 60 degrees with the flow direction. Alternatively, or in addition, the first orifice 112 may be defined by one or more rounded edges (not shown) to avoid pressure losses due to sharp edges and/or sudden changes in cross-sectional area.

Embodiments of the check valve may offer one or more advantages. For instance, when coupled with oval gear flow meters with diaphragm pumps, check valves can improve the accuracy of flow measurement. In some exemplary embodiments, the check valve may decrease the number of false rotational counts of the oval gear meter sensed due to flow oscillations by a factor of between about 5 and about 9. In other embodiments, check valves may eliminate approximately 90% of false rotational counts of oval gear meters. Embodiments including two check valves coupled to inlet and outlet recesses of oval-gear flow meters may eliminate back flow of fluid during operation of a diaphragm pump.

In certain embodiments, tightly sealed check valves (e.g., using inserts and/or O-rings) when combined with improved oval-gear meter designs may also prevent fluid leakage at low flow rates. Such embodiments may allow the oval gear meter to accurately measure flow rates lower than traditional oval gear meters, extending the operability of such flow meters to flow rates of approximately two to four times lower than flow rates at which typical flow meters operate.

Check valves integrally coupled to flow meters as described herein can also offer additional advantages. For instance, the check valve may be directly molded together with a flow meter. Such embodiments can be manufactured economically and offers a robust flow regulating device, thereby eliminating multiple components and assembly. Such embodiments also eliminate the need for flow adapters and fasteners which create additional pressure drop in a fluid line and/or flow leakage due to improper sealing.

Finally, check valves according to the embodiments described herein can operate at low cracking pressures. Such embodiments can be beneficial because of rapid (e.g., milliseconds) opening and closing of the valve. Additionally, the components of the check valve can be made of moldable plastic and the ball can be made of sapphire, thereby making the check valve biocompatible and suitable for use in healthcare and pharmaceutical industry (e.g., drug delivery) and heavy industry (e.g., with corrosive chemicals).

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A check valve, comprising:
a first flange having a first orifice;
a second flange positioned opposite to the first flange along a center axis of the check valve, at a first distance from the first flange, the second flange having a second orifice;
a ball seated against the first orifice when the check valve is in a closed position;
one or more stoppers positioned at a second distance from the first flange along the axis of the check valve, the second distance being less than or equal to the first distance, extending radially inwardly toward the center axis of the check valve, the center axis passing through the first orifice; and
a pair of seating members configured to contact at least a portion of the ball and seat the ball against the first orifice from an open position to the closed position, the pair of seating members being positioned further away from the ball than the stoppers in a direction along the center axis when the check valve is in the open position,
wherein, a fluid flows through the first orifice and the second orifice when the check valve is in the open position,
the fluid is configured to move the ball from the first orifice, the fluid further configured to exert a pressure on the ball, the pressure moving the ball away from the first orifice, and
the stoppers are configured to abut the ball when the check valve is in a fully open position.

2. The check valve of claim 1, wherein the ball is spherical in shape.

3. The check valve of claim 1, wherein the ball comprises sapphire.

4. The check valve of claim 1, further comprising
a first set of ribs extending from the first flange, and
a second set of ribs extending from the second flange, the first set of ribs are configured for engaging with the second flange and the second set of ribs are configured for engaging with the first flange.

5. The check valve of claim 4, wherein the first and second sets of ribs engage with the second flange and the first flange respectively via a snap fit or a frictional fit.

6. The check valve of claim 4, wherein the stoppers are integrally formed on the first set of ribs.

7. The check valve of claim 4, wherein the pair of seating members are defined on the second set of ribs, wherein the pair of seating members is configured for exerting a first force on the ball, the first force adapted to seat the ball against the first orifice when the check valve is in the closed position.

8. The check valve of claim 7, wherein the ball is configured for exerting a second force on the pair of seating members, the second force of the ball adapted to overcome the first force from the pair of seating members, and wherein the pair of seating members are configured for deflecting toward the second flange when the second force acts on the pair of seating members.

9. The check valve of claim 1, wherein the second distance approximately equals one-half of a radius of the first orifice.

10. The check valve of claim 1, wherein the second distance is less than approximately one-half of a radius of the first orifice.

11. The check valve of claim 1, wherein the stoppers are coupled to the first flange.

12. The check valve of claim 1, further comprising an insert sealingly engaging with the first orifice of the first flange, the insert having an orifice, the orifice having a tapered internal surface in communication with the fluid, the tapered internal surface forming a taper angle with the axis of the check valve.

13. The check valve of claim 12, wherein the taper angle is between about 30 degrees and about 60 degrees.

14. The check valve of claim 1, wherein the axis of the check valve is parallel to a generally vertical direction.

15. The check valve of claim 1, wherein the ball is adapted to move from the second distance to the first orifice, when the fluid stops flowing from the first orifice to the second orifice.

16. The check valve of claim 15, wherein the ball is adapted to move from the second distance to the first orifice, when the fluid flows from the second orifice to the first orifice.

17. A flow-regulating device for regulating a flow in a fluid line, comprising:
a housing;
an inlet recess defined in the housing;
an outlet recess defined in the housing, such that a fluid flows in a forward direction from the inlet recess to the outlet recess; and
a first check valve positioned in the inlet recess, the first check valve comprising
a first flange having a first orifice
a second flange positioned opposite the first flange along an axis of the first check valve, at a first distance from the first flange, the second flange having a second orifice,
a ball seated against the first orifice when the first check valve is in a closed position, and
one or more of stoppers,
a pair of seating members configured for exerting a first force on the ball, the first force adapted to seat the ball against the first orifice when the first check valve is in the closed position,
the ball being configured for exerting a second force on the pair of seating members, the second force of the ball adapted to overcome the first force from the pair of seating members,
the pair of seating members being configured to deflect toward the second flange when the second force acts on the pair of seating members,
wherein, the fluid flows through the first orifice and the second orifice when the first check valve is in an open position,
the fluid is configured to lift the ball from the first orifice, the fluid is further configured to push the ball towards the second orifice, and
the stoppers are configured to abut the ball when the first check valve is in a fully open position.

18. The flow-regulating device of claim 17, further comprising a second check valve positioned in the outlet recess.

19. The flow-regulating device of claim 18, further comprising an oval-gear flow meter positioned on the housing between the inlet recess and the outlet recess, the oval-gear flow meter configured for measuring a flow rate of the fluid in the fluid line.

20. The flow-regulating device of claim 19, wherein the first check valve is configured for preventing the fluid from flowing via the second orifice to the first orifice.

21. The flow-regulating device of claim 19, wherein at least one of the first and second check valves is adapted to prevent the fluid from entering into the oval-gear flow meter when the fluid flows in a reverse direction, whereby the reverse direction is opposite to the flow direction of the fluid in the open position.

22. A fluid system for supplying a fluid, comprising:
a fluid source holding the fluid;
a diaphragm pump coupled to the fluid source, the diaphragm pump configured for pressurizing the fluid;
a fluid line coupled to the diaphragm pump, the fluid line providing a passage for the pressurized fluid; and
a flow regulating device coupled to the fluid line, the flow regulating device comprising,
a housing,
an inlet recess defined in the housing,
an outlet recess defined in the housing, such that a fluid flows in a direction from the inlet recess to the outlet recess, and
a first check valve positioned in the inlet recess, the first check valve comprising
a first flange having a first orifice,
a second flange positioned opposite the first flange along an axis of the first check valve, at a first distance from the first flange, the second flange having a second orifice,
a ball seated against the first orifice when the first check valve is in a closed position, and
one or more of stoppers positioned at a second distance from the first flange along the axis of the first check valve, the second distance being less than or equal to the first distance, the stoppers extending radially inwardly toward a center axis of the check valve, the center axis passing through the first orifice, and
a pair of seating members configured to contact at least a portion of the ball and seat the ball against the first orifice from an open position to the closed position, the pair of seating members being positioned further away from the ball than the stoppers in a direction along the center axis when the check valve is in the open position,
wherein, the fluid flows through the first orifice and the second orifice when the first check valve is in an open position,
the fluid is configured to lift the ball from the first orifice, the fluid is further configured to push the ball towards the second orifice, and
the stoppers are configured to abut the ball when the first check valve is in a fully open position.

23. The fluid system of claim 22, wherein the flow regulating device is configured for performing at least one of:
measuring a flow rate of fluid through the fluid line;
moving the fluid in a forward direction through the first check valve;
preventing flow in a reverse direction through the first check valve; and
stopping the fluid from flowing through the first check valve when the diaphragm pump generates flow oscillations.

* * * * *